US011900759B2

(12) United States Patent
Mejenborg et al.

(10) Patent No.: US 11,900,759 B2
(45) Date of Patent: *Feb. 13, 2024

(54) LOTTERY TICKET DISPENSING UNIT WITH BRAKE ROLLER

(71) Applicant: Scientific Games International, Inc., Newark, DE (US)

(72) Inventors: Sten Hallundbaek Mejenborg, Cumming, GA (US); James Jonathan Holbrook, Cumming, GA (US); Ian Robert Scott, Duluth, GA (US)

(73) Assignee: Scientific Games, LLC, Alpharetta, GA (US)

( * ) Notice: Subject to any disclaimer, the term of this patent is extended or adjusted under 35 U.S.C. 154(b) by 482 days.

This patent is subject to a terminal disclaimer.

(21) Appl. No.: 17/070,080

(22) Filed: Oct. 14, 2020

(65) Prior Publication Data

US 2022/0114860 A1 Apr. 14, 2022

(51) Int. Cl.
*G07F 17/32* (2006.01)

(52) U.S. Cl.
CPC ........ *G07F 17/3216* (2013.01); *G07F 17/329* (2013.01)

(58) Field of Classification Search
CPC .... B65D 83/12; B65H 2404/165; G07B 3/04; G07B 5/02; G07F 11/68; G07F 17/42; G07F 17/329; G07F 17/3216; Y10T 225/30
See application file for complete search history.

(56) References Cited

U.S. PATENT DOCUMENTS

| | | | |
|---|---|---|---|
| 4,272,001 A | 6/1981 | Horniak | |
| 5,113,758 A * | 5/1992 | Chou | G07F 11/68 101/316 |
| 5,222,624 A * | 6/1993 | Burr | G07F 17/329 221/124 |
| 5,383,572 A * | 1/1995 | Mrajca | B65H 3/063 221/6 |
| 5,833,104 A | 11/1998 | Horniak et al. | |

(Continued)

FOREIGN PATENT DOCUMENTS

| | | |
|---|---|---|
| EP | 2 447 917 A1 | 5/2012 |
| EP | 3 627 436 A1 | 3/2020 |
| WO | WO 1994/020908 A1 | 9/1994 |

OTHER PUBLICATIONS

EPO Search Report, dated May 9, 2022.

*Primary Examiner* — Gene O Crawford
*Assistant Examiner* — Kelvin L Randall, Jr.
(74) *Attorney, Agent, or Firm* — Dority & Manning, P.A.

(57) ABSTRACT

A lottery ticket dispensing unit includes at least one ticket compartment and a separation module that has a drive roller and an opposed idler roller. A motor is geared to the drive roller and is switchable between a convey mode wherein the drive roller engages and conveys a leading ticket to a separation position and a brake mode wherein the motor provides a reverse retarding force to the drive roller to brake the drive roller against an attempted reeling of the lottery tickets. from the dispensing unit. A controller switches the motor between the convey and brakes modes such that in the brake mode, power to the motor is interrupted and windings in the motor are short-circuited.

20 Claims, 10 Drawing Sheets

(56) References Cited

U.S. PATENT DOCUMENTS

| | | | | |
|---|---|---|---|---|
| 7,665,394 | B2 * | 2/2010 | Roberts | G07F 11/68<br>221/25 |
| 7,874,509 | B2 * | 1/2011 | Kenney | B26F 3/002<br>242/563.2 |
| 10,017,319 | B1 | 7/2018 | Moelgaard et al. | |
| 2004/0178559 | A1 * | 9/2004 | Harty | B65H 31/3081<br>271/113 |
| 2006/0071046 | A1 * | 4/2006 | Roberts | G07F 17/329<br>225/10 |

* cited by examiner

LOTTERY TICKET DISPENSING UNIT WITH BRAKE ROLLER

BACKGROUND

Instant lottery tickets (e.g., "scratch-off" lottery tickets) are sold at many types of retail locations including, stores, such as grocery stores, general merchandise stores, and the like. Various configurations of lottery ticket dispensers have been proposed in the industry for this purpose, including electronic dispensers that automatically dispense a ticket from a bin or compartment upon receipt of an electronic command signal.

The typical scratch-off lottery tickets are delivered to retail establishments in the form of an interconnected strip in a fanfold or rolled configuration, wherein perforation lines define individual tickets. In this regard, the individual dispensing bins must be equipped with a mechanism for separating the tickets in a reliable and repeatable manner. Failure of the final ticket separation process can be costly. For example, if the dispenser does not separate a ticket exactly along the perforation, the ticket may be "unsellable" or information needed for verification can be separated from the ticket and lost.

In addition to achieving a reliable separation of the correct number of leading tickets, the dispensing bins should also prevent pulling of additional unintended or unauthorized tickets from the bin (sometimes referred to as "reeling" in the industry). Conventional electronic ticket dispensers generally use a motor-driven wheel/roller opposed by an idler wheel/roller, wherein the continuous strip of tickets is conveyed through the nip defined between these rollers. Ticket reeling can result, for example, from a vendor exerting an excessive pulling force on the leading ticket during the dispense cycle that exceeds the frictional engagement between the drive roller and the ticket, or may also be the result of a fraudulent attempt to pull on a leading ticket edge in an attempt to extract unauthorized tickets from the dispenser.

The above-cited issue has been addressed in the art in various ways. For example, U.S. Pat. No. 4,272,001 and WO 1994/020908 describe a ticket dispenser that utilizes a ratchet mechanism or gear to lock rotation of the internal dispenser drive wheel after a dispense cycle. U.S. Pat. No. 5,833,104 describes use of a brake wheel that engages the drive wheel and prevents rotation thereof after a dispense cycle.

U.S. Pat. No. 10,017,319 discloses a solution wherein the lottery ticket dispenser includes a motor geared to a drive roller, the motor and drive roller rotatable in a forward and reverse direction. An idler roller is disposed opposite to and defines a nip with the drive roller, wherein the lottery tickets are engaged by the drive roller and conveyed through the nip. A scanner is disposed within the housing at a location to detect a forward edge of a leading lottery ticket in the housing. A controller controls the drive mechanism such that after the leading lottery ticket is dispensed out the slot, power is supplied to the motor to generate a retarding reverse direction torque by the drive roller on the next adjacent lottery ticket for a predetermined time period without reversing direction of the drive roller. This retarding force does not cause the drive roller to reverse direction and draw the leading ticket back into to housing, but is sufficient to increase a "holding effect" at the nip on the adjacent lottery ticket and prevent reeling of tickets by a person grasping the leading ticket (that extends out of the slot) and attempting to pull additional tickets from the housing. A torque sensor configured with the drive roller or gearing senses a forward direction torque on the drive roller from an attempt to pull on the leading ticket extending from the slot. The torque sensor is in communication with the controller, which increases the retarding reverse direction torque as a function of the increasing forward direction torque during the predetermined time period. In other words, the controller offsets an increasing forward direction torque on the drive roller with an increasing retarding torque.

The solution proposed by U.S. '319 patent is a significant improvement in the industry. However, it has been found that application of power to the drive motor to apply the retarding force for a prolonged period of time can overheat and possibly damage or degrade the life of the motor The present invention is directed to an improved system and method for preventing ticket reeling in a lottery ticket dispenser to address at least the issue discussed above.

SUMMARY

Objects and advantages of the invention will be set forth in part in the following description, or may be obvious from the description, or may be learned through practice of the invention.

In accordance with aspects of the invention, a lottery ticket dispensing unit is provided for dispensing a continuous strip of lottery tickets, such as scratch-off lottery tickets well known in the industry. The dispensing unit includes at least one ticket compartment in which a stack or roll of the continuous trip of lottery tickets is contained for storage and dispensing. The dispensing unit includes a separation module in which a leading ticket of the continuous strip of lottery tickets is separated and dispensed from the unit, the separation module including a drive roller and an opposed idler roller with a nip defined therebetween, with a motor configured to drive the drive roller, for example via a gearing arrangement. The motor is switchable between a convey mode, wherein the drive roller engages and conveys the leading ticket through the nip to a separation position, and a brake mode wherein the motor provides a reverse retarding force to the drive roller thereby braking the drive roller against an attempted reeling of the lottery tickets from the assembly. A controller is in communication with the motor and is operable to switch the motor between the convey mode and the brake mode. The motor and controller configured such that in the brake mode, power to the motor is interrupted and windings in the motor are short-circuited, which results in any rotation of the drive roller from the attempted reeling of the lottery tickets to essentially convert the motor to a generator. The short-circuited windings create a load on the generator that produces the retarding force on the drive roller.

In a particular embodiment, the separation module includes an automatic separator device upstream of the drive roller in a conveying direction of the lottery tickets. The drive roller conveys the leading ticket to the separation position such that a line between the leading ticket and an adjacent ticket is upstream of the drive roller and presented to the separator device mechanism. Once the leading ticket is stopped at the separation position, the controller and motor are configured to rotate the drive roller to slightly tension the leading ticket and then switch the motor to the brake mode prior to activation of the separator device. Then, after separation of the leading lottery ticket, the controller rotates the drive roller to eject the leading lottery ticket from the separation module.

In a certain embodiment, the separator device includes a head that is driven (directly or indirectly) by a motor in a linear path along the line. The line between adjacent tickets in the continuous strip of lottery tickets may be a perforation line, wherein the head is uniquely configured to engage and burst the perforation line as the head moves along the linear path.

In one embodiment, the ticket dispensing unit also includes a feed module adjacent to the ticket compartment, the feed module including a feed roller geared to a feed motor, wherein the feed roller engages and conveys the continuous strip of lottery tickets from the ticket compartment to the separation module.

The feed module may include an optical scanner disposed to detect a mark on a backside of the lottery tickets. The scanner and feed motor can be in communication with a feed controller that generates dispense cycle instructions based on detection of the mark that control the feed motor in coordination with the motor in the separation module to advance the leading ticket to the separation position.

In a unique embodiment, the separation module is detachably connected to the feed module.

In still another embodiment, the dispensing unit includes two of the ticket compartments arranged side-by side, and the separation module extends across the two tickets compartments.

The present invention also encompasses a lottery ticket bin having a bin housing, which can be variously configured. For example, the bin housing may include a bottom, back wall, sides, an open top, and an open front side. The bin housing may be configured for attachment to additional bin housings in a stacked configuration. The lottery ticket bin also includes an embodiment of the lottery ticket dispensing unit discussed above.

The present invention also encompasses a separation module as a stand-alone device that can be attached to an existing lottery ticket dispensing unit, for example attached to a feed module of the existing dispensing unit. This separation module may be in accordance with any of the embodiments discussed above.

In a particular embodiment, the separation module is configured to service two ticket compartments arranged side-by side in the lottery ticket dispensing bin, wherein the drive roller and the idler having a length so as to extend across the two tickets compartments.

The separation module may be provided with connectors for detachable connection of the separation module to the existing lottery ticket dispensing unit, for example to the feed module of such unit.

The present invention also encompasses a lottery ticket dispensing array that includes a plurality of the lottery ticket dispensing bins discussed above in a stacked configuration.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
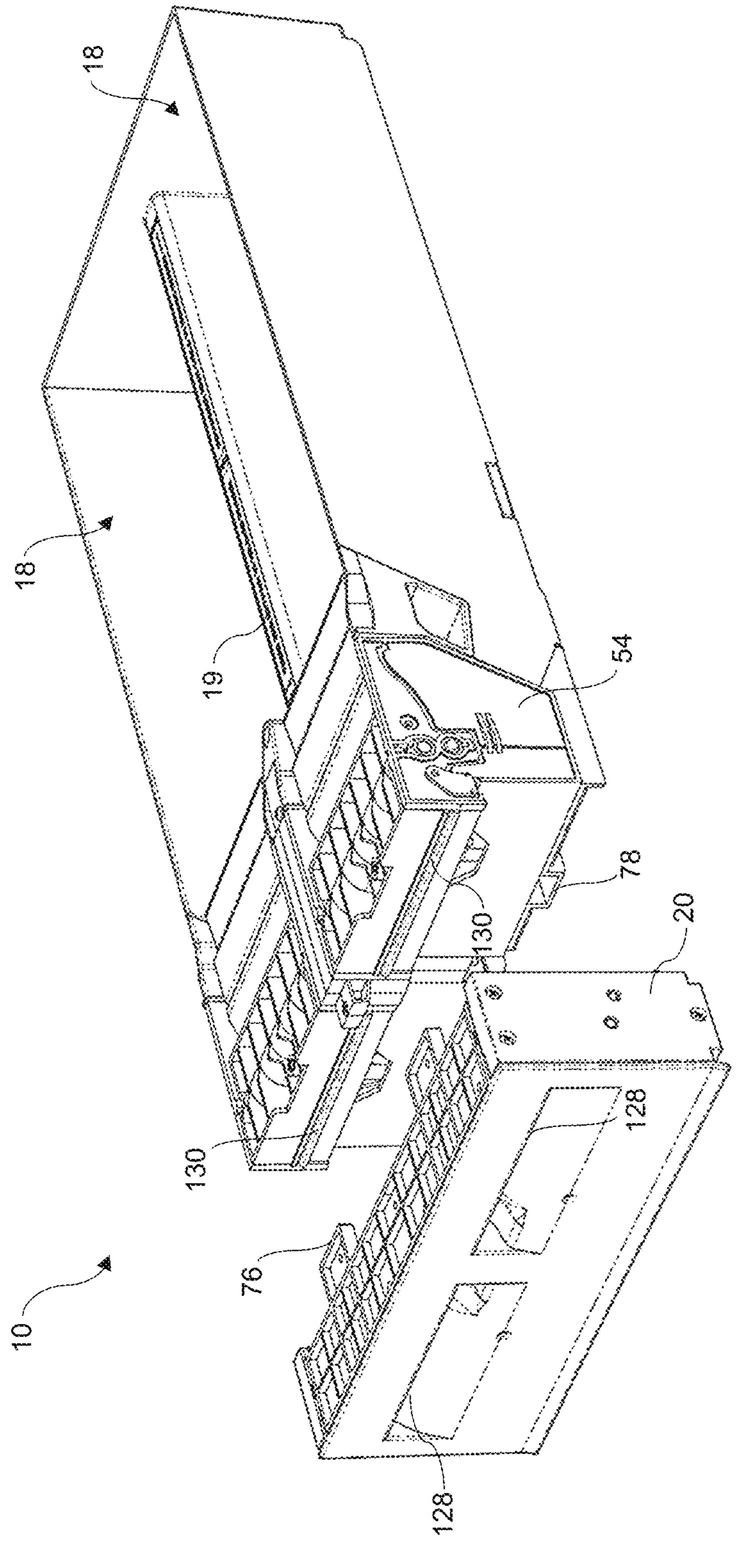
FIG. 1 is a perspective view of a lottery ticket dispensing unit with a detachable separation module in accordance with aspects of the invention.
Figure 2:
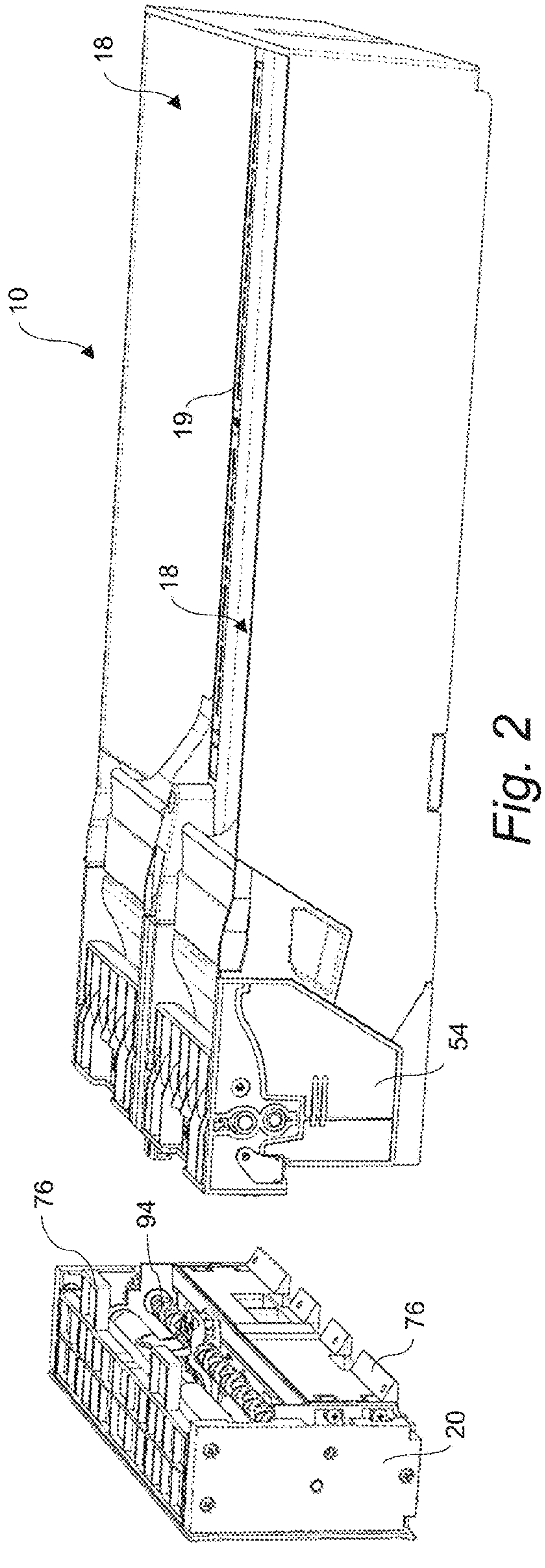
FIG. 2 is an alternative perspective view of the lottery ticket dispensing unit with a detachable separation module.
Figure 3:
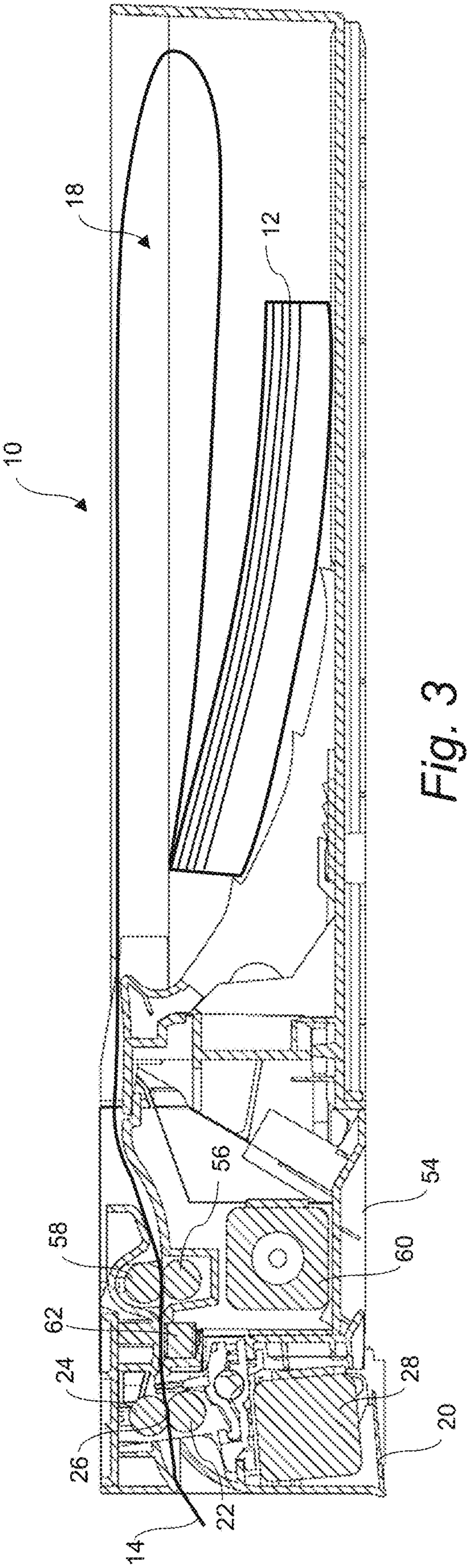
FIG. 3 is a side cut-away view of the lottery ticket dispensing unit of FIG. 1 with a stack of interconnected lottery tickets contained therein.

FIGS. 1-3 depict an embodiment of a lottery ticket dispensing unit 10 for dispensing a continuous strip 12 of interconnected lottery tickets 14 provided in a roll or fan-folded stack (depicted in FIG. 3), such as a roll or stack of conventional scratch-off lottery tickets. The lottery tickets 14 are connected at a separation line, such as a perforation line, between adjacent tickets. Each lottery ticket 14 in the stack typically includes a machine-readable code printed on a front or back side thereof, such as an alpha-numeric code, bar code, QR code, or the like. The type of code may vary depending on the desired information content of the code, space on the ticket 14, and so forth. The use of such codes on lottery tickets 14 for various functions related to inventory, identification, verification, and security are well-known.

Figure 6:
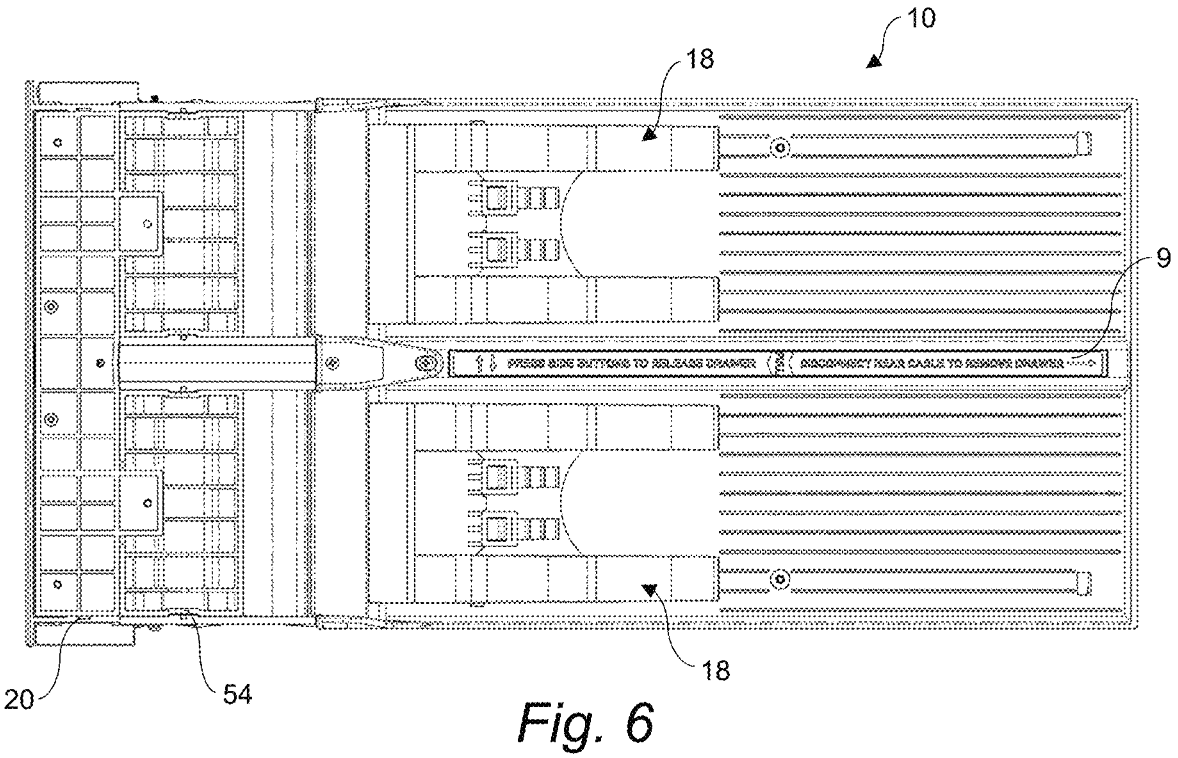
FIG. 6 is a bottom view of the lottery ticket dispensing unit of FIG. 1.

The dispensing unit 10 includes at least one ticket compartment 18 formed by a bottom and sides and may have an open top for easier insertion of the continuous strip 12 of lottery tickets therein. The ticket compartment 18 may have any manner of internal guide/retaining structure to aid in orienting and dispensing the stack of lottery tickets 14. In the illustrated embodiments, the dispensing unit 10 includes two of the ticket compartments 18 separated by a wall 19 such that each dispensing unit 10 is configured to dispense multiple stacks of the same or different lottery tickets 14. FIG. 6 provided a top view of the dispensing unit 10 with multiple side-by-side ticket compartments 18.

The dispensing unit 10 includes a separation module 20 through which the continuous strip 12 of lottery tickets from the ticket compartment 18 is threaded and a leading lottery ticket 14 is separated and dispensed from the unit 10. The separation module 20 may be integral (i.e., single piece construction) with the other components of the dispensing unit 10. In the embodiment depicted in the figures, the separation module 20 is detachably connected to the dispensing unit 10 via a feed module 54 (described in greater detail below), as depicted in FIGS. 1-2. With this configuration, the separation module 20 can be removed for maintenance or replaced without having to pull the rest of the dispensing unit 10 from a bin 70 (FIG. 16) in which the dispensing unit 10 is inserted. In the embodiments with multiple ticket compartments 18, the separation module 20 extends across all of the ticket compartments 18.

FIGS. 2-3 and 7-9 depict an automatic electronic embodiment of the separation module 20 having a drive roller 22 and opposed idler roller 24. A nip 26 is defined between the rollers 22, 24 through which the strip 12 of lottery tickets 14 is conveyed, as seen in FIG. 3. A first motor 28 drives the drive roller 22, for example via a gear arrangement 30 or other suitable drive means. The motor 28 is controlled by a controller 34, which may be provide on a circuit board 36 within the separation module 20. Via the controller 34, the motor 28 is switchable between a convey mode wherein the drive roller 22 engages and conveys the leading lottery ticket 14 through the nip 26 to a separation position (discussed below) and a brake mode wherein the motor 28 provides a reverse retarding force to the drive roller 22 thereby braking the drive roller 22 against an attempted reeling of the lottery tickets 14 from the dispensing unit 10. This retarding force does not cause the drive roller 22 to reverse direction and draw the lead ticket 14 back into to separation module 20, but is sufficient to generate a "holding effect" at the roller nip 26 on the adjacent lottery ticket 14 to prevent reeling of the continuous strip 12 of tickets by a person grasping the leading ticket 14 extending from a dispensing slot 128 (FIG. 3) and attempting to pull additional tickets from the dispensing unit 10.

Figure 15:
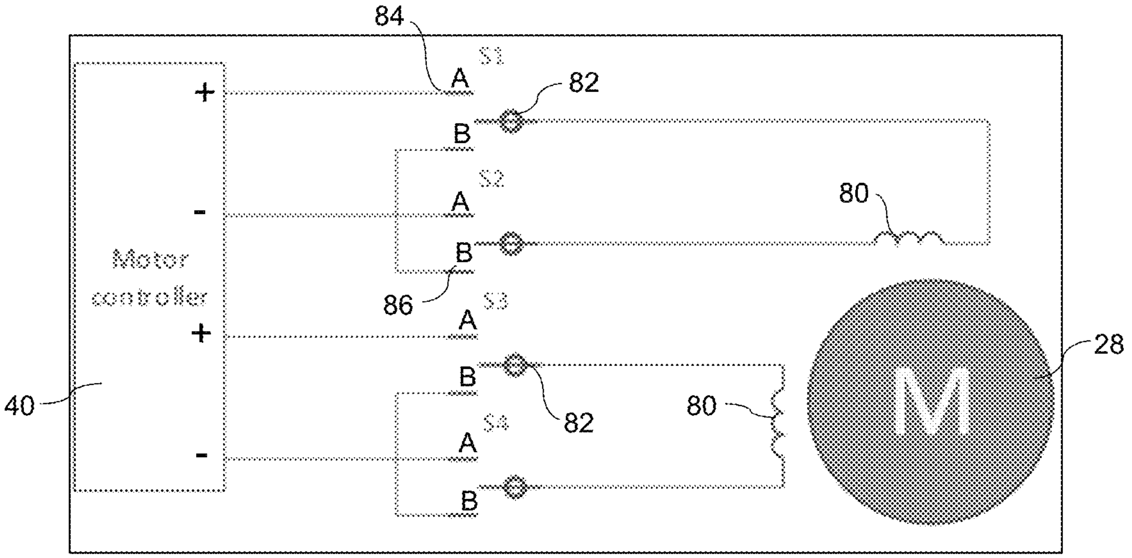
FIG. 15 is a diagram view of a wiring scheme for the drive roller motor in the separation module.

Referring to FIG. 15, operation of the motor 28 by the controller 34 via electronic switching states is depicted. In the operational convey mode of the motor 28, the sets of switches 82 are connected to the power contacts 84 for the motor windings 80. In the operational brake mode of the motor 28, power to the motor 28 is interrupted and the sets of switches 82 are connected to the shorting contacts 86 that internally short the windings 80. In this brake mode, any rotation of the drive roller 22 from an attempted reeling of the lottery tickets essentially converts the motor 28 to a generator as long as the drive roller 22 rotates. The short-circuited windings 80, however, create a load on the motor 28 (in generator mode), as does any load on a generator. This self-induced load results in retarding force on the motor rotor, and thus on the drive roller 22. This operation is desirable for applying a brake or retarding force in that it does not require a constant voltage to be applied to the windings 80 (in reverse polarity) at all times when the dispensing unit is "idle" (i.e., not dispensing a ticket). Power to the motor 28 is interrupted and the self-induced retarding (brake) force is only generated if there is a reeling attempt.

Referring particularly to FIGS. 7-13, the separation module 20 includes an automatic separator device 38 upstream of the drive roller 22 in a conveying direction of the lottery tickets 14 that separates the leading lottery ticket 14 from its adjacent lottery ticket. The drive roller 22 is driven to convey the leading ticket 14 to the separation position such that a line (e.g., a perforation line) between the leading ticket 14 and an adjacent ticket 14 is upstream of the drive roller 22 at a location to acted on by the separator device 23. At this point in the dispense sequence, the drive roller 22 may be rotated slightly (e.g., 1-3 mm of ticket advancement) and then braked while a feed roller 56 in the upstream feed module 54 is braked in order to longitudinally tension the lottery ticket 14 between the two sets of rollers prior to activation of the separator device 38. This tension prevents the lottery tickets 14 from bowing while the separator device 38 advances along the line between the tickets. If the bowing is not prevented, the separator device 38 may not properly engage the separation line along its entire length resulting in an incomplete separation or damage to the tickets along the separation line.

Once the leading ticket 14 has been completely separated from the adjacent ticket, the driver roller 22 is again driven to eject the leading ticket from the dispensing unit 10 via the dispensing slot 128.

In a unique embodiment, the separator device 38 includes a head 42 provided on a shuttle 40 that is driven in a linear path (indicated by the dashed arrow line in FIG. 7) along the line between the adjacent tickets 14. The head shuttle 40/head 42 can be drive in various ways. In the illustrated example, a bi-directional drive mechanism 88 is provided for this purpose and includes a drive rod 94 having a length to extend across the one or more ticket compartments 18. The drive rod 94 is driven by a second motor 90, for example via a second gear arrangement 92 or other suitable drive means. The drive rod 94 includes a track 96 defined therein. The shuttle 40 has a member that engages and slides in the track 96. The shuttle 40 is slidingly supported on a stationary guide 43 that extends along the drive rod 94. Thus, rotation of the drive rod 94 results in the shuttle 40 (and head 42) moving in a linear path (corresponding to the longitudinal axis of the drive rod 94) adjacent to the drive roller 22/idler roller 24, this linear path corresponding to the location of the separation position for the line between adjacent lottery tickets 14. The drive rod 94 and the linear path of the shuttle 40 extend across the multiple ticket compartments 18 so that the shuttle 40 and head 42 are able to separate the leading lottery ticket 14 from both of the ticket compartments 18.

Figure 10:
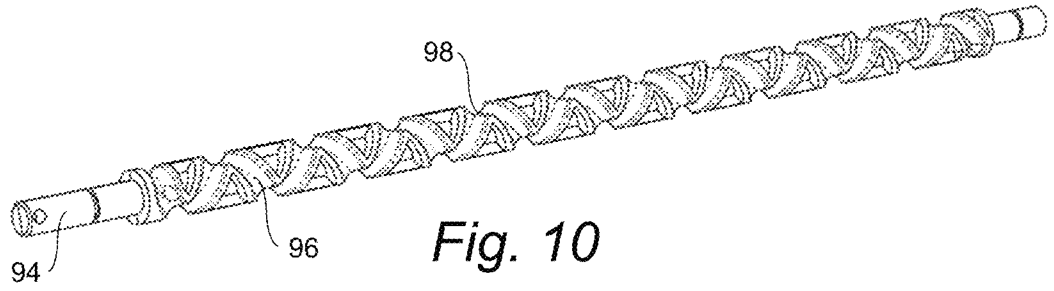
FIG. 10 is a perspective view of an embodiment of a drive rod for a separator device used in the separation module of FIG. 7.

FIG. 10 depicts an embodiment of the drive rod 94 wherein the track 96 is defined by a double-helix groove 98. This type of double-helix groove 98 enables reverse direction (bi-directional) movement of the shuttle 40 along its linear path without reversing the rotational direction of the drive rod 40. As the shuttle 40 moves in one direction and reaches an end of the drive rod 94, it will automatically engage in the oppositely oriented track of the double-helix groove 98 and reverse direction while the drive rod 94 rotates in the same direction.

Figure 11:
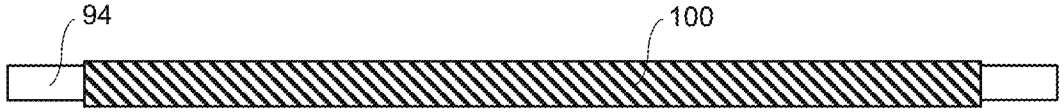
FIG. 11 is a perspective view of an alternative embodiment of a drive rod for a separator device used in the separation module of FIG. 7.

FIG. 11 depicts an alternate embodiment wherein the drive rod 94 includes a screw thread track 100 having a uni-directional pitch. With this configuration, the shuttle 40 engaged in the track 110 can only move in a single direction unless the rotational direction of the drive rod 94 is reversed.

It should thus be appreciated that the bi-directional drive mechanism 88 used to impart back-and-forth movement to the shuttle 40 can include any combination of a non-reversible motor 90, a reversible motor 90, a drive rod 94 with a helix-groove 98, or drive rod 94 with a uni-directional thread 110.

Figure 12:
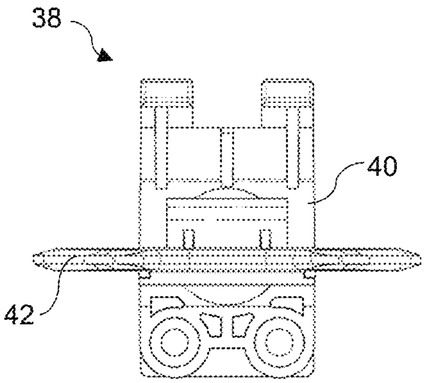
FIG. 12 is a top view of a shuttle and head for a separator head used in the separation module of FIG. 7.
Figure 13:
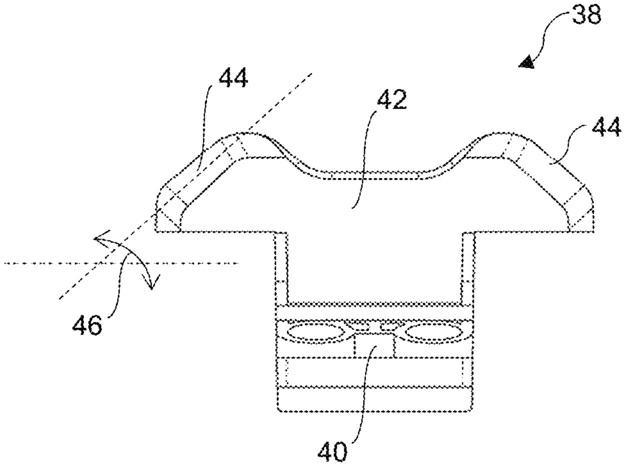
FIG. 13 is a side view of the shuttle and head of FIG. 12.

The head 42 that is carried by the shuttle 40 may have various configurations. For example, the head 42 may be a static member mounted on the shuttle 40, and may have a blade or other sharp edge that essentially engages and cuts the lottery tickets along the line between the leading lottery ticket 14 and the adjacent lottery ticket. In an embodiment wherein the line between the tickets 14 is a perforation line, the head 42 may be designed with a blunt engagement surface designed to essentially engage the line from below or above the surface of the tickets 14 to essentially burst the perforations as the head 42 moves along the linear path of the shuttle 40. A particularly unique configuration of the head 42 is depicted in FIGS. 12 and 13, wherein the head 42 has an inclined leading edge 44 (inclined at an angle 46 relative to a horizontal line). This leading edge 44 has a lower leading portion that essentially engages the perforation line from below as the head 42 moves along its linear path and pushes the line up the face of the leading edge 44. Continued linear movement of head 42 causes the upper portion of the leading edge 44 to burst through the perforations from below (or from above depending on location of the tickets 14 relative to the head 42/shuttle 40). Thus, separation of the tickets 14 along the line is accomplished without presenting a cutting edge perpendicular to the perforation line, which could result in ragged or torn edges along the line. The angled leading edge 44 has a length so as to ensure that the lower portion of the edge 44 engages below the line and the upper portion of the edge 44 extends through the line in the tickets even with a slight amount of bowing in the tickets as the shuttle 40 progresses along its linear path.

Other examples of a head 42 may be, for example, a cutting wheel or other type of cutting element that is movable relative to the shuttle 40. Movement of the shuttle 40 may be used to also rotate or drive the head 42, or the head 42 may have an independent drive.

Figure 7:
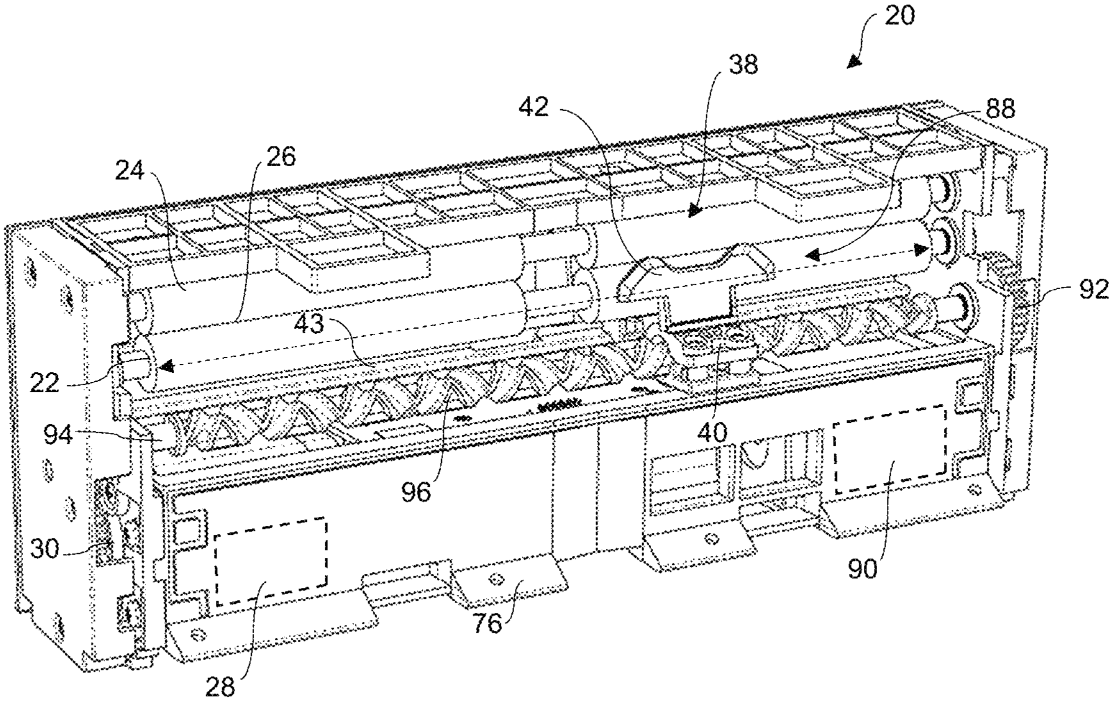
FIG. 7 is a perspective back view of the separation module from the lottery ticket dispensing unit of FIG. 1.
Figure 8:
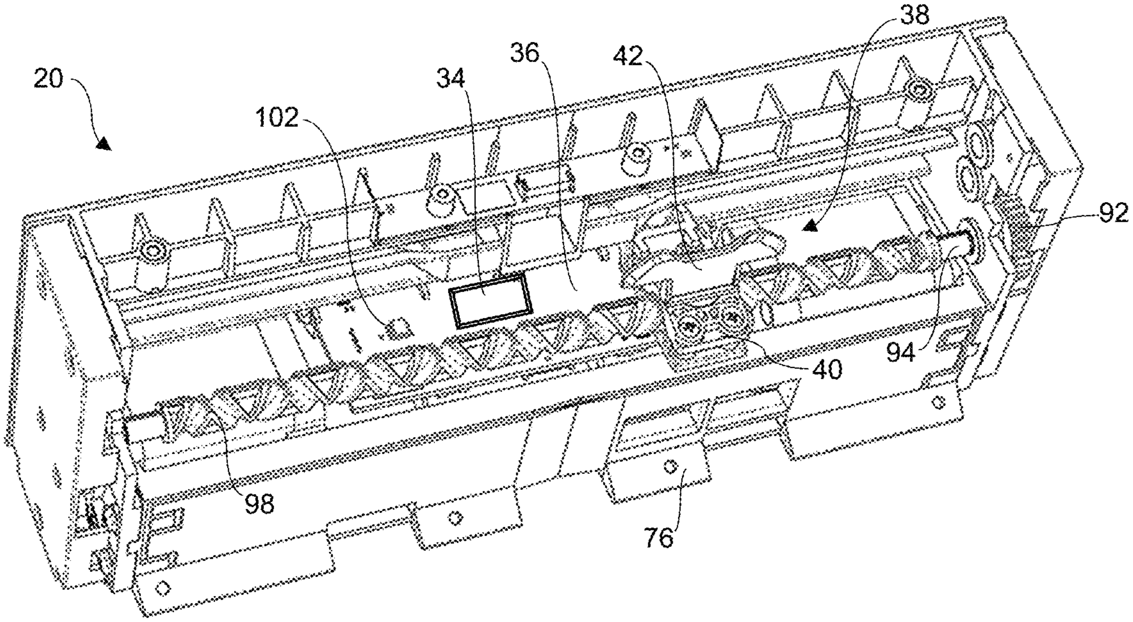
FIG. 8 is a perspective back view of the separation module of FIG. 7 with the drive roller and idler roller removed.
Figure 9:
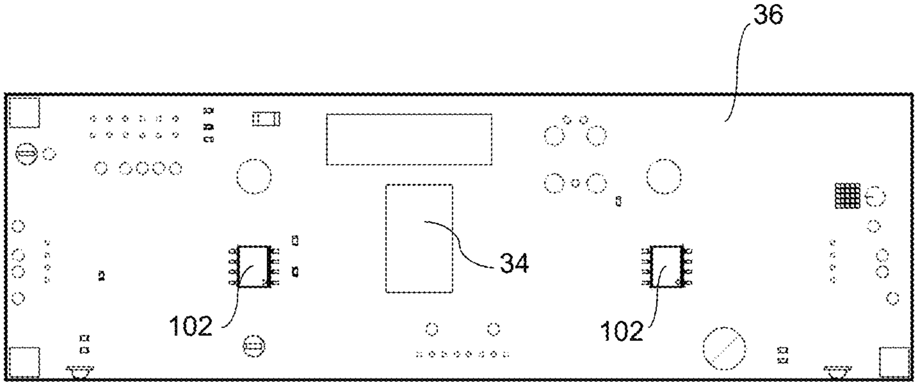
FIG. 9 is a view of a control circuit board from the separation module of FIG. 7.

In the depicted embodiments wherein the dispensing unit has side-by-side ticket compartments 18 and the shuttle 40 moves across both of the compartments, the head 42 may include oppositely disposed ones of the inclined leading edges 44 in a wing-like configuration, as seen in FIGS. 7 and 13.

In one embodiment, the second motor 90 that drives the rod 94 is a reversible motor. The shuttle 40 can be controlled such that after separating the leading lottery ticket 14 and reaching its end of travel along the rod 94 in one direction, the shuttle 40 reverses direction and returns to a rest location past the continuous strip 12 of the lottery tickets 14 (depicted by the position of the shuttle in FIGS. 7 and 8). In the embodiment wherein the track 96 is double-helix groove 98 (FIG. 10), this reversal is accomplished without reversing rotation of the drive rod 94. In the embodiment wherein the track 96 is a single direction screw thread 100 (FIG. 11), this reversal can be accomplished by reversing rotation of the second motor 90 and drive rod 94. Once at the rest location, the shuttle waits for a subsequent dispense command from the controller 34. Referring to FIG. 7, if the next ticket dispense sequence is from the left-hand ticket compartment, the shuttle 40 must be driven to the left. In the double-helix groove 98 embodiment, this could be accomplished by a single-direction motor 90 rotating the drive rod 94 so that the shuttle 40 first moves completely to the right and automatically reverses direction at the right-hand end of the drive rod 94. This process, however, will take unnecessary time and excess run time of the motor 90. Thus, it may be desired that the motor 90 is reversible. With a reversible motor 90 and the shuttle 40 at its rest position, the motor 90 (and rotational direction of the drive rod 94) can be immediately reversed causing the shuttle 40 to move immediately to the left.

In the embodiment wherein the drive rod 94 has the uni-directional screw thread 100, the motor 90 is a reversible motor in order to move the shuttle 40 in both directions along the drive rod 94.

Referring again to FIG. 7 wherein the shuttle 40 is depicted at its rest position in front of the right-hand ticket compartment 18, if the next ticket dispense sequence is for the right-hand ticket compartment, the shuttle 40 is first driven to a rest position at the left-hand ticket compartment 18 and waits there until the line between the leading lottery ticket 14 and adjacent lottery ticket is conveyed to the separation position. Then, the shuttle 40 is driven completely to the right to separate the ticket and returns to a rest position in front of the left-hand ticket compartment.

Figure 14:
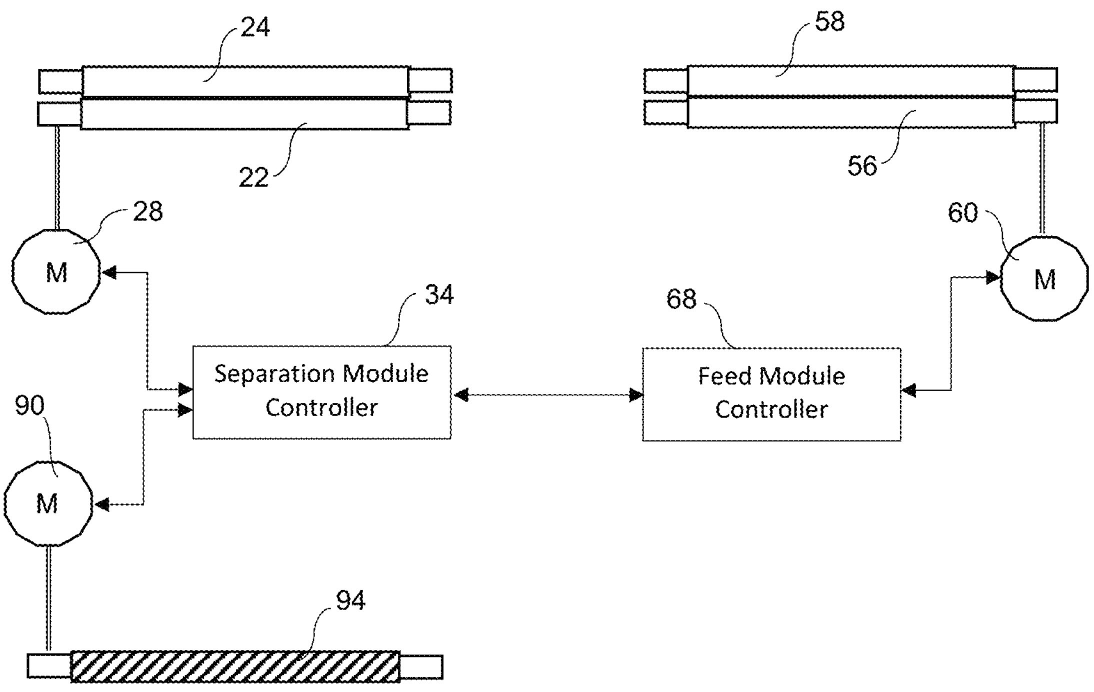
FIG. 14 is a diagram view of the controllers for the separation module and feed module for a lottery ticket dispensing unit.

In order to track and control position of the shuttle 40 along the drive rod 94, one or more proximity sensors 102 (FIGS. 8 and 9) can be provided along the path of the shuttle 40 and in communication with the controller 34 (FIG. 14). In the depicted embodiment, two such sensors 102 are provided directly on a circuit board 36 mounted below the drive rod 94. The sensors 102 are located essentially at the two rest positions of the shuttle 40 in front of the ticket compartments 18. Any conventional proximity sensor can be used for this purpose. The sensors 102 indicate the shuttle 40 has returned to its rest position after a separation and that the drive roller 22 can be rotated to eject the separated leading lotter ticket 14.

The present disclosure encompasses the various embodiments of the separation module 20 described above as a stand-alone invention.

Referring again to FIGS. 1-6, the dispensing unit 10 can also include a feed module 54 operationally configured between the separation module 20 and the ticket compartment(s) 18. The feed module 54 includes a feed roller 56 and opposed idler roller 58 with a nip therebetween. The feed roller 56 is driven by a feed motor 60 (e.g., via gears). The feed roller 56 engages and conveys the continuous strip 12 of lottery tickets 14 from the ticket compartment 18 and to the separation module 20. In the embodiment depicted in the figures, the separation module 20 is detachably connected to the feed module 54. As seen in FIG. 2, connectors 76 (e.g., male members) may be provided at various locations around the back perimeter of the separation module that fit into or otherwise cooperate with counterpart connection members 78 (e.g., female members) provided at the front face of the feed module 54, as seen in FIG. 1. Any suitable detachable connection devices can be used for this purpose.

An optical scanner 62 (FIG. 3) is disposed below or above the path of the lottery tickets 14 through the feed module 54 to detect a mark on the tickets 14. The scanner 62 may be any conventional reader, such as a point scanner, linear scanner, laser scanner, LED image scanner, and so forth. The mark may be a barcode or Q-code printed on the back of each lottery ticket 14. The exact distance from the mark to the leading edge of each ticket is known. The scanner 62 is in communication with a feed controller 68 (FIG. 14) and, based on detection and location of the mark and the known length of the tickets 14, the controller 68 controls the run time of the feed motor 60/feed roller 56 so that the line between the leading ticket 14 and the adjacent ticket is stopped at the separation position discussed above. The run time of the motor 60 may be based on an internal controller clock or may be measured by an encoder or other device that counts revolutions of the feed roller 56.

In alternate embodiments, the scanner 62 may detect the perforation line between adjacent tickets or any other mark or physical characteristic of the lottery tickets 14 for purposes of control of the feed roller 56 as discussed above.

In an embodiment depicted in FIG. 7*a*, the scanner 40 also functions to detect the separated forward edge 15*a* of the lead lottery ticket 14*a*, thereby eliminating the need for a separate sensor 106.

As discussed above, in the embodiment of the dispensing unit 10 wherein the separation module 20 operates in an automatic electronic mode, the drive roller 24 must be operated in coordination with the feed roller 56. FIG. 14 diagrammatically depicts that the separation module controller 34 and the feed module controller 68 are in communication for this purpose. At certain times during the dispense sequence, the driver roller 24 and feed roller 56 will be driven in unison. During the tensioning of the lottery tickets 14 prior to separation discussed above, the driver roller 24 will be slightly rotated and then stopped while the feed roller 56 is braked. For ejection of the separated leading ticket 14, the driver roller 22 will be driven while the feed roller 56 is braked. The controllers 34, 68 ensure the proper coordination of their respective drive rollers 22, 56.

Although not depicted in the figures, in an alternate embodiment, the controllers 34, 68 could be in communication with a common central controller that controls the various operations of the motors 28, 60.

Figure 16:
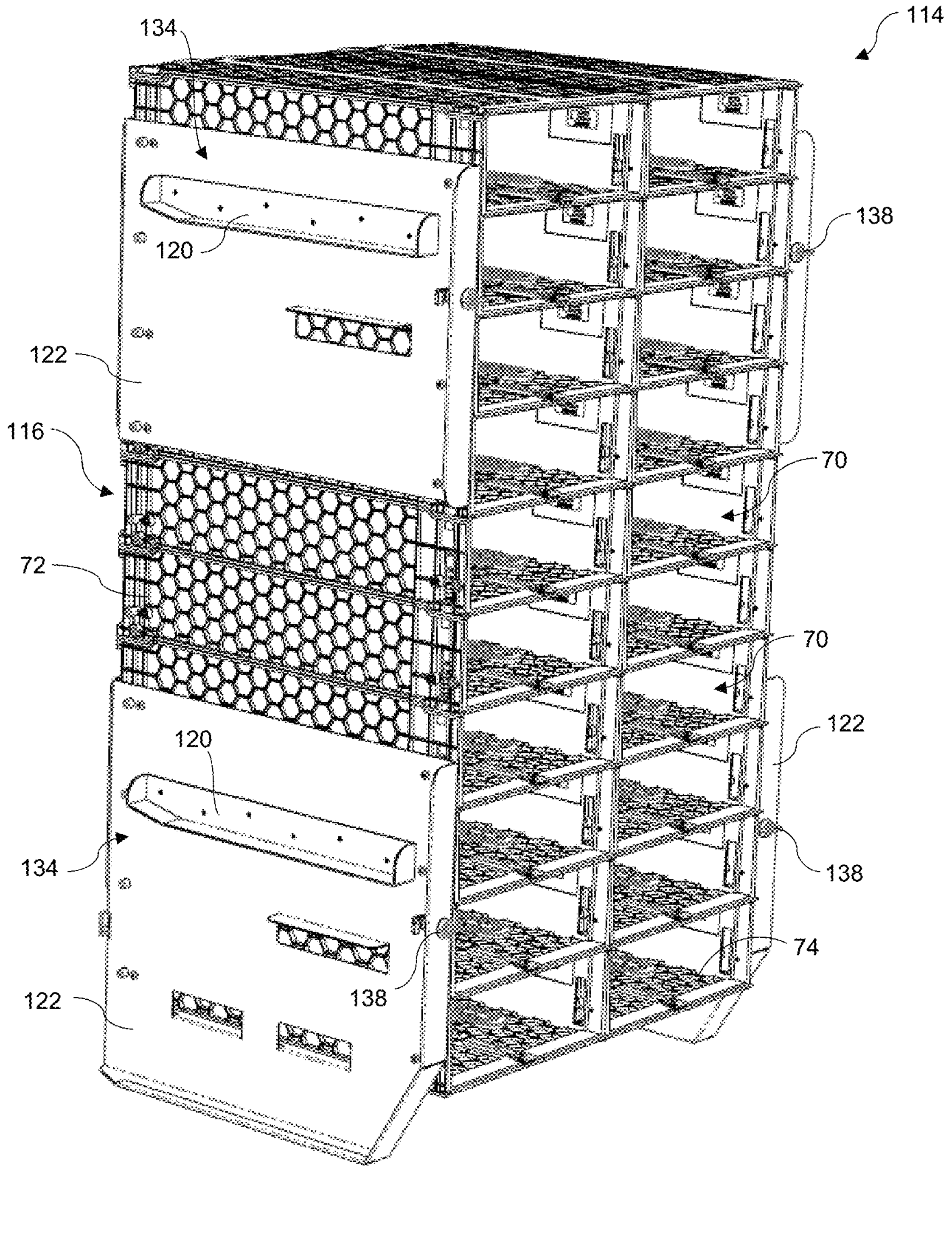
FIG. 16 is a perspective view of a lottery ticket dispenser array in accordance with aspects of the invention.

The lottery ticket dispensing units 10 may be stand-alone operational units. In a particular embodiment, the units 10 are designed for insertion into an individual bin 70. FIG. 16 depicts a plurality of the bins 70 connected together by any suitable means to form a stacked configuration 116. In the depicted embodiment, the stacked configuration 116 includes two columns of the bins 70. Each bin 70 has a housing that may include a bottom 74 and sides 72. The front and top of the bin 70 is open. Thus, in the stacked configuration 116, the bottom of one bin 70 encloses the open top of the bin 70 directly beneath it. The open front of the bin 70 allows for relatively easy insertion and removal of the dispensing unit 10.

Figure 18:
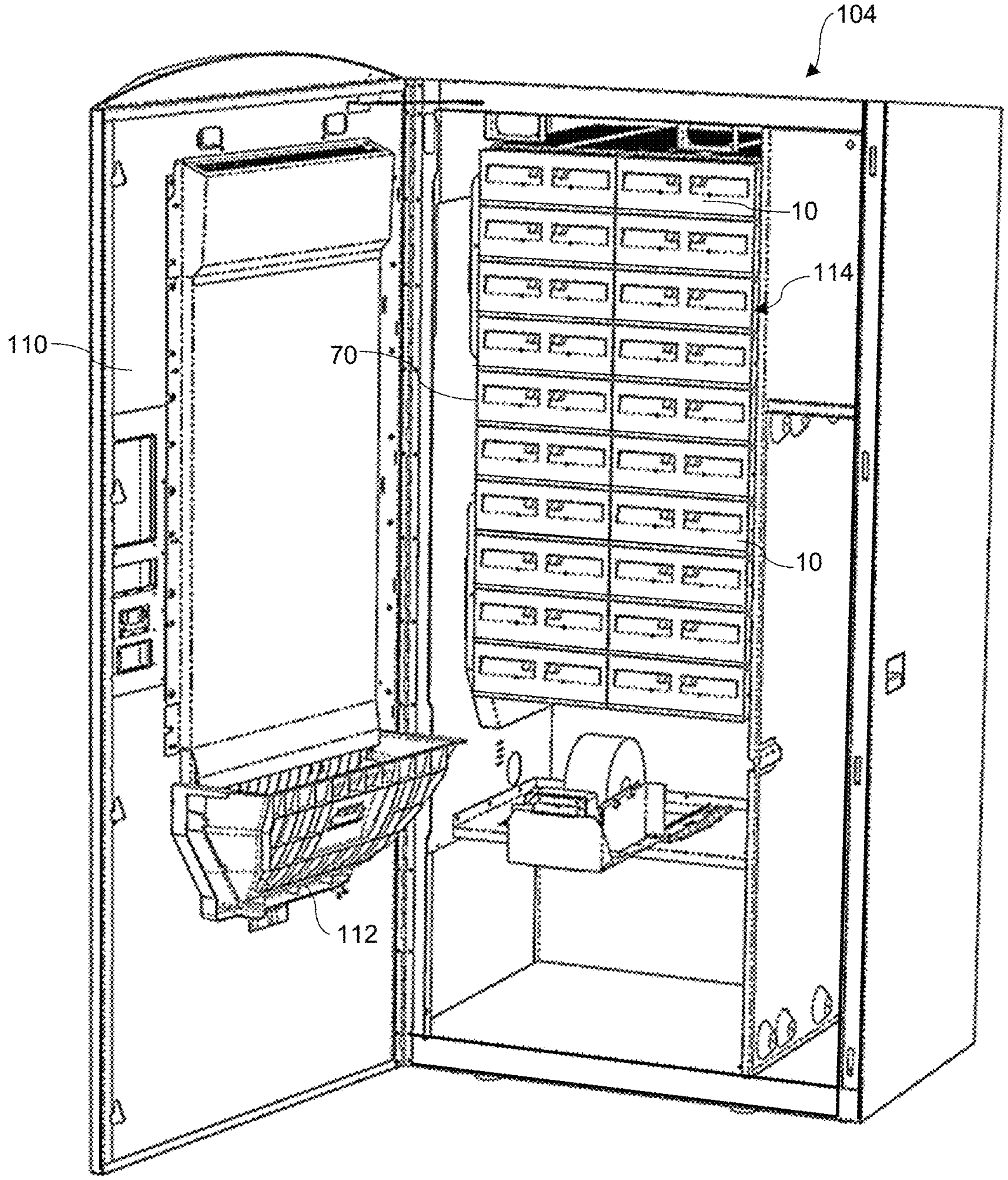
FIG. 18 is a perspective view of the lottery ticket dispensing system of FIG. 17 with the dispending units inserted into the individual bins of the dispenser array of FIG. 16.

Referring to FIGS. 16 and 18, a dispensing unit 10 can be inserted into each bin 70 in the stacked configuration 116. At this point, the bins 70 and dispensing units 10 can be considered as a lottery ticket array 114, which can act as a stand-alone operational unit, for example under or on top of a counter at a retail establishment.

The present disclosure encompasses an individual lottery ticket dispensing bin 70 with associated dispensing unit 10 in accordance with any of the embodiments discussed above as a stand-alone invention.

The present disclosure also encompasses the lottery ticket array 114 having the stacked configuration 116 of bins 70 with associated dispensing units 10 as a stand-alone invention.

Figure 17:
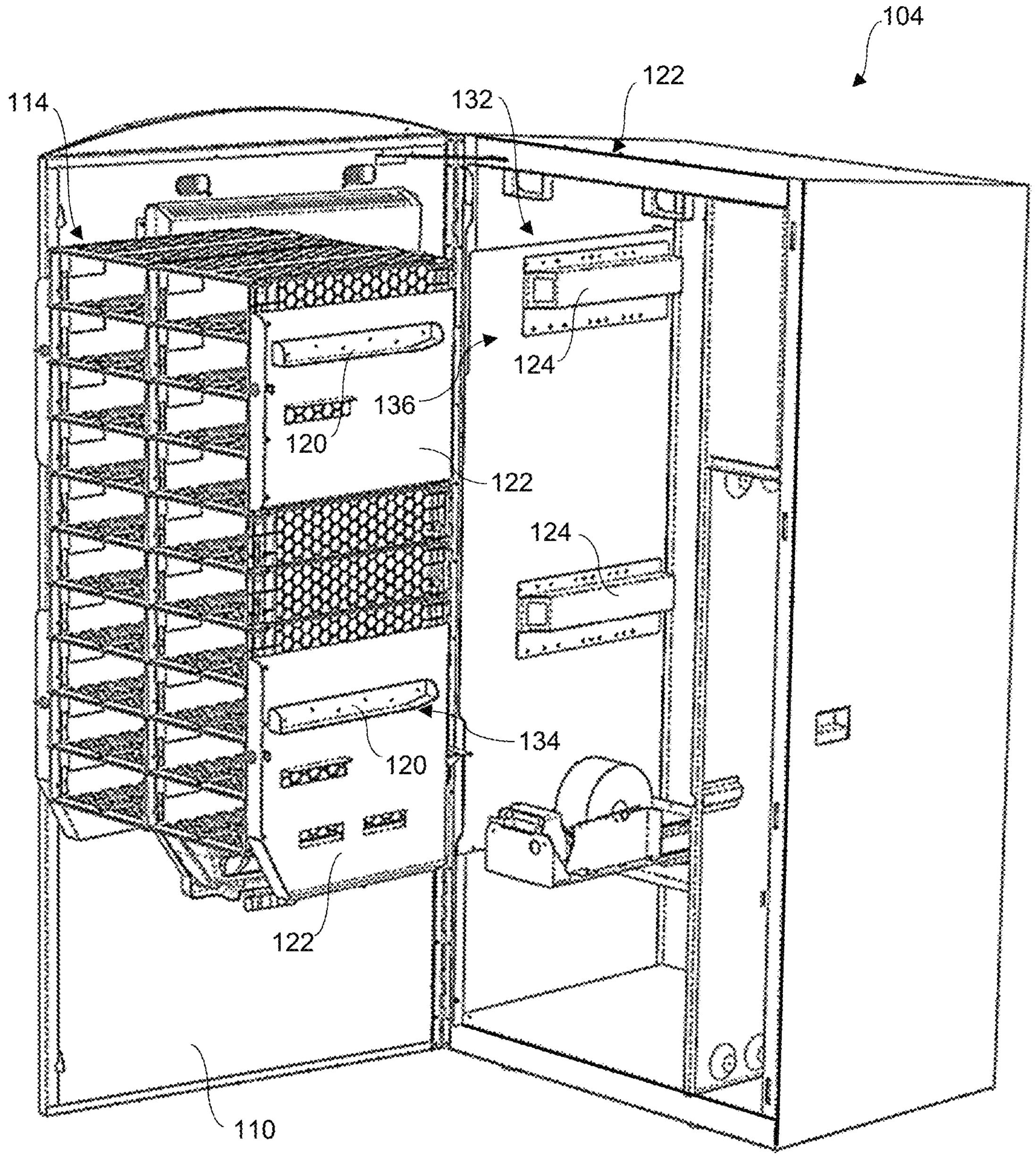
FIG. 17 is a perspective view of a lottery ticket dispensing system using the array of FIG. 16.

Referring to FIGS. 16 through 18, a lottery ticket dispensing system 104 is depicted wherein the lottery ticket array 114 is utilized in a self-serve dispensing cabinet. The cabinet includes a housing 106 having walls 108 and a door 110 that enclose an internal space in which the array 114 is inserted as a single unit. The array 114 formed from the stacked configuration 116 of individual bins 70 has opposite sides 118 formed by the aligned sides of the individual bins 70. A detachable support system 132 is provided so that the array 114 can be easily inserted into and removed from the cabinet housing 106 as a unit. In the depicted embodiment, this support system 132 includes at least one first component 134 attached to each of the opposite sides 118 of the stacked configuration 116, the first component 134 cooperating with a second component 136 of the detachable support system 132 provided on the inner side walls 108 of the cabinet housing 106. The first component 134 may be a rail 120 that slidingly engages with a rail support or guide 124 that constitutes the second component 136. Depending on the number of bins 70 and height of the array 114, two or more of the first 134 and second 136 components can be provided for each side of the array 114, as depicted in FIGS. 16-18.

The first component 134 may include a plate 122 that spans the sides of a plurality of the individual bins 70 within the stacked configuration 116, wherein one or more of the rails 120 are provided on the plate 122.

A quick-release lock 138 can be provide on each of the plates 122 to lock the array 114 in the cabinet housing 106, such as a quarter-turn lock having an arm that engages behind an edge of the housing 106 in the locked position.

The support system 132 and single-unit array 114 is a significant improvement in terms of simplicity, weight, and costs as compared to other systems that utilize individual pull-out drawers or bins supported by individual structures on the walls of the cabinet housing 106.

In a particularly versatile embodiment of the lottery ticket dispensing system 104, the lottery ticket array 114 has a first automatic operational mode when inserted into the cabinet housing 106 in which, for each of the bins 70 and respective dispensing unit 10, the separation module 20 ("automatic separation module") automatically separates and ejects the leading ticket 14 from the continuous strip 12 of lottery tickets as described above. As is common with self-service dispensers in the industry, the front door 110 of the cabinet housing 106 includes a selection device that enables a purchaser to choose a particular lottery ticket 14 from the various different tickets provided in the plurality of bins 70. Once payment is received, the individual bin 70 containing the selected lottery ticket 14 is activated and operates as described above. The separated leading lottery ticket is ejected out from the bin 70 via the dispensing slot 128 and can be discharged through a slot in the front door 110 of the cabinet or fall into a receptacle 112 within the interior of the cabinet housing 106. The purchaser accesses the receptable 112 from the front of the cabinet housing 106 and retrieves their lottery ticket 14.

Figure 4:
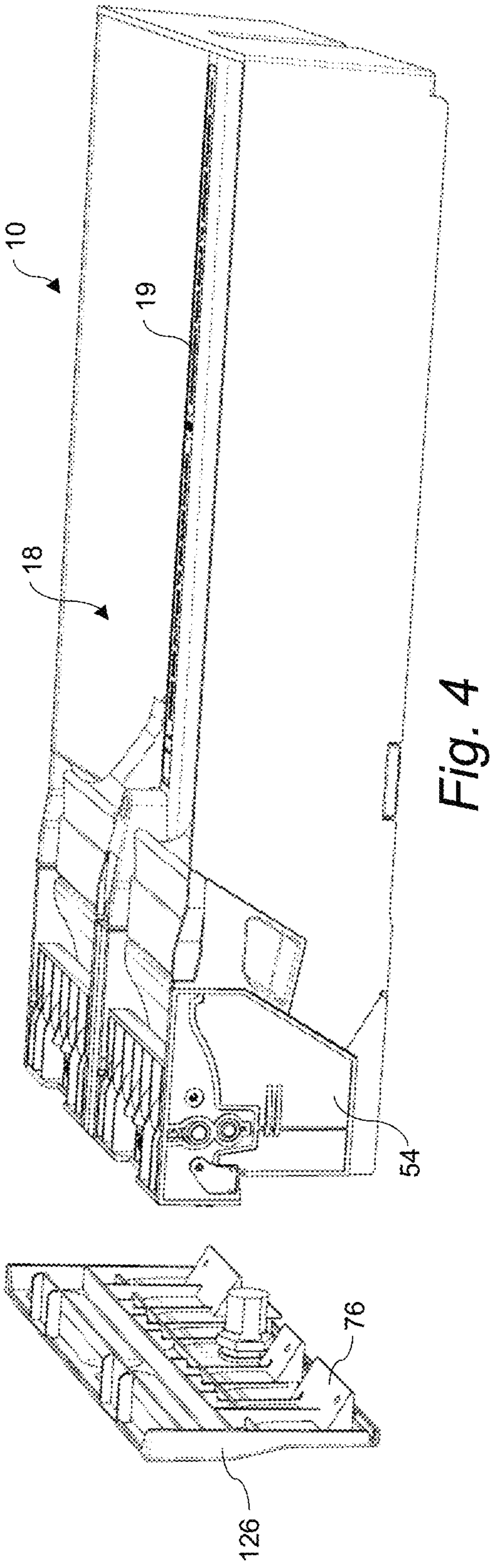
FIG. 4 is a perspective view of an alternative embodiment of a lottery ticket dispensing unit with a detachable manual separation unit.
Figure 5:
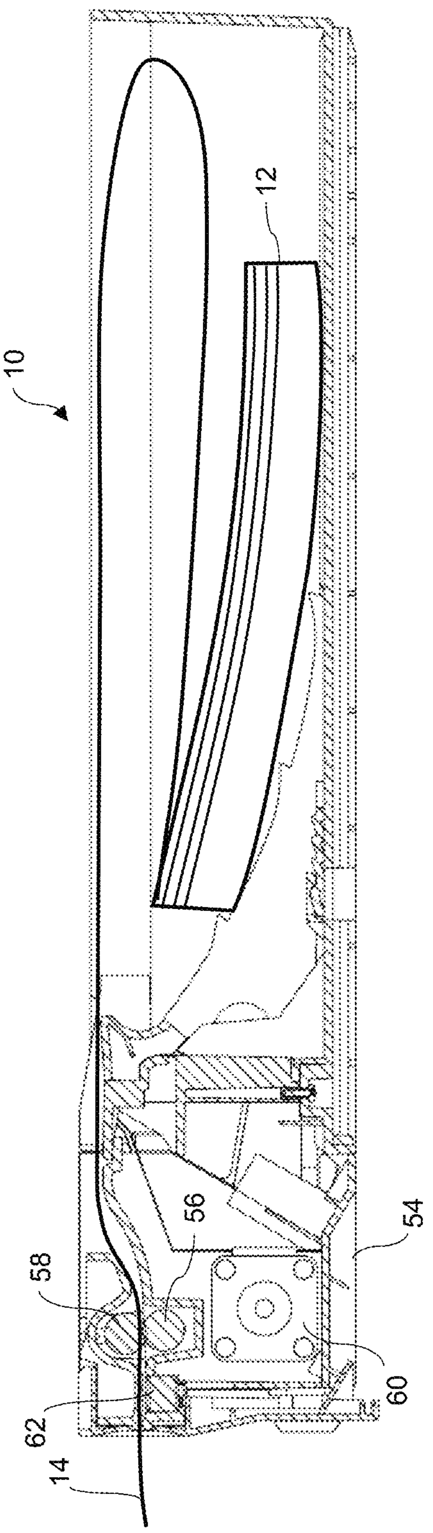
FIG. 5 is a side cut-away view of the lottery ticket dispensing unit of FIG. 4 with a stack of interconnected lottery tickets contained therein.

Referring to FIGS. 4 and 5, they dispensing system 104 may a plurality of manual separation modules 126 that are detachably connectable to the feed modules 54 of the dispensing units 10 upon removal of the array 114 from the cabinet housing 106 and detachment of the automatic separation modules 20 from the feed modules 54. It may be desired in certain situations that the array 114 also be used in a stand-alone manual mode, for example on or below a counter in a retail establishment. The manual separation modules 126 have the same pattern of connectors 76 and mate to the front of the feed modules 54 in the same manner as the automatic separation modules 20. The manual separation module 126 essentially provides a structural front face for the dispensing unit 10 and includes a dispensing slot through which at least a portion of the leading lottery ticket 14 is conveyed. A store clerk or other person grasps the lottery ticket an pulls the ticket against a tear bar 130 that is provided either in the feed module 54 past (downstream) of the drive roller 22 (as seen in FIG. 1) or provided in the manual separation module 126. The feed module controller 68 controls rotation of the feed roller 56 so that the line (e.g., perforation line) between the leading lottery ticket 14 and the adjacent ticket is adjacent to the tear bar 130.

It should be appreciated that the present invention also encompasses the lottery ticket array 114 that can be configured to use in an automatic mode of operation within a cabinet housing 106 or as a stand-alone unit in a manual mode of operation, as described above. The array 114 includes a plurality of the individual bins 70 in a stacked configuration 116 and the dispensing unit 10 inserted into each of the bins 70. The array 114 includes a plurality of the manual separation modules 126 connectable to the feed modules 54 upon removal of the automatic separation modules 20 from the feed modules 54 so that the lottery ticket array is operable in the stand-alone manual operational mode when removed from the cabinet housing 106.

The embodiments particularly shown and described above are not meant to be limiting, but instead serve to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A lottery ticket dispensing unit for dispensing a continuous strip of lottery tickets, comprising:

at least one ticket compartment;

a separation module in which a leading ticket of the continuous strip of lottery tickets is separated and dispensed from the unit, the separation module comprising:

a drive roller and an opposed idler roller with a nip defined between the drive roller and idler roller;

a motor geared to the drive roller, the motor switchable between a convey mode wherein the drive roller engages and conveys the leading ticket through the nip to a separation position and a brake mode wherein the motor provides a reverse retarding force to the drive roller thereby braking the drive roller against an attempted reeling of the lottery tickets from the dispensing unit;

a controller operable to switch the motor between the convey mode and the brake mode; and the motor and controller configured such that in the brake mode, power to the motor is interrupted and windings in the motor are short-circuited, wherein rotation of the drive roller from the attempted reeling of the lottery tickets converts the motor to a generator, the short-circuited windings creating a load on the generator that produces the retarding force on the drive roller.

2. The lottery ticket dispensing unit as in claim 1, wherein the separation module comprises an automatic separator device upstream of the drive roller in a conveying direction of the lottery tickets, wherein the drive roller conveys the leading ticket to the separation position such that a line between the leading ticket and adjacent ticket is upstream of the drive roller and presented to the separator device.

3. The lottery ticket dispensing unit as in claim 2, wherein once the leading ticket is stopped at the separation position, the controller and motor are configured to rotate the drive roller to slightly tension the leading ticket and then switch the motor to the brake mode prior to activation of the separator device.

4. The lottery ticket dispensing unit as in claim 3, wherein the controller is configured to rotate the drive roller after separation of the leading lottery ticket along the line to eject the leading lottery ticket from the separation module.

5. The lottery ticket dispensing unit as in claim 2, wherein the separator device comprises a head that is driven in a linear path along the line.

6. The lottery ticket dispensing unit as in claim 5, wherein the separation module comprises a second motor configured to drive the head along the linear path.

7. The lottery ticket dispensing unit as in claim 5, wherein the line between adjacent tickets in the continuous strip of lottery tickets is a perforation line, the head configured to engage and burst the perforation line as the head moves along the linear path.

8. The lottery ticket dispensing unit as in claim 1, further comprising a feed module adjacent to the ticket compartment, the feed module comprising a feed roller geared to a feed motor, wherein the feed roller engages and conveys the continuous strip of lottery tickets from the ticket compartment to the separation module.

9. The lottery ticket dispensing unit as in claim 7, wherein the feed module further comprises an optical scanner disposed to detect a mark on a backside of the lottery tickets, the scanner and feed motor in communication with a feed controller that generates dispense cycle instructions based on detection of the mark that control the feed motor in coordination with the motor in the separation module to advance the leading ticket to the separation position.

10. The lottery ticket dispensing unit as in claim 8, wherein the separation module is detachably connected to the feed module.

11. The lottery ticket dispensing unit as in claim 10, comprising two of the ticket compartments arranged side-by side, the separation module extending across the two tickets compartments.

12. A lottery ticket bin, comprising:

a bin housing, the bin housing configured for attachment to additional bin housings in a stacked configuration; and a lottery ticket dispensing unit inserted into the bin housing, the lottery ticket dispensing unit comprising:

at least one ticket compartment;

a separation module in which a leading ticket of the continuous strip of lottery tickets is separated and dispensed from the unit, the separation module comprising:

a drive roller and an opposed idler roller with a nip defined between the drive roller and idler roller;

a motor geared to the drive roller, the motor switchable between a convey mode wherein the drive roller engages and conveys the leading ticket through the nip to a separation position and a brake mode wherein the motor provides a reverse retarding force to the drive roller thereby braking the drive roller against an attempted reeling of the lottery tickets from the dispensing unit;

a controller operable to switch the motor between the convey mode and the brake mode; and the motor and controller configured such that in the brake mode, power to the motor is interrupted and windings in the motor are short-circuited, wherein rotation of the drive roller from the attempted reeling of the lottery tickets converts the motor to a generator, the short-circuited windings creating a load on the generator that produces the retarding force on the drive roller.

13. A separation module for use with a lottery ticket dispensing unit for dispensing a continuous strip of lottery tickets interconnected by perforation lines, comprising:

a drive roller and an opposed idler roller with a nip defined between the drive roller and idler roller;

a motor geared to the drive roller, the motor switchable between a convey mode wherein the drive roller engages and conveys the leading ticket through the nip to a separation position and a brake mode wherein the motor provides a reverse retarding force to the drive roller thereby braking the drive roller against an attempted reeling of the lottery tickets from the dispensing unit;

a controller operable to switch the motor between the convey mode and the brake mode; and the motor and controller configured such that in the brake mode, power to the motor is interrupted and windings in the motor are short-circuited, wherein rotation of the drive roller from the attempted reeling of the lottery tickets converts the motor to a generator, the short-circuited windings creating a load on the generator that produces the retarding force on the drive roller.

14. The separation module as in claim 13, further comprising an automatic separator device upstream of the drive roller in a conveying direction of the lottery tickets, wherein the drive roller conveys the leading ticket to the separation position such that a line between the leading ticket and adjacent ticket is upstream of the drive roller and presented to the separator device.

15. The separation module as in claim 14, wherein once the leading ticket is stopped at the separation position, the controller and motor are configured to rotate the drive roller to slightly tension the leading ticket and then switch the motor to the brake mode prior to activation of the separator device mechanism.

16. The separation module as in claim 15, wherein the separator device comprises a head that is driven in a linear path along the perforation line between the leading ticket and the adjacent ticket.

17. The separation module as in claim 16, wherein, the head is configured to engage and burst the perforation line between the leading ticket and the adjacent ticket as the head moves along the linear path.

18. The separation module as in claim 13, wherein the separation module is configured to service two ticket compartments arranged side-by side in the lottery ticket dispensing unit, the drive roller and the idler having a length so as to extend across the two tickets compartments.

19. The separation module as in claim 13, further comprising connectors for detachable attachment of the separation module to the lottery ticket dispensing unit.

20. A lottery ticket dispensing array, comprising a plurality of lottery ticket dispensing bins in a stacked configuration, each lottery ticket dispensing bin comprising:

a bin housing, the bin housing configured for attachment to additional bin housings in a stacked configuration; and a lottery ticket dispensing unit inserted into the bin housing, the lottery ticket dispensing unit comprising:

at least one ticket compartment;

a separation module in which a leading ticket of the continuous strip of lottery tickets is separated and dispensed from the unit, the separation module comprising:

a drive roller and an opposed idler roller with a nip defined between the drive roller and idler roller;

a motor geared to the drive roller, the motor switchable between a convey mode wherein the drive roller engages and conveys the leading ticket through the nip to a separation position and a brake mode wherein the motor provides a reverse retarding force to the drive roller thereby braking the drive roller against an attempted reeling of the lottery tickets from the dispensing unit;

a controller operable to switch the motor between the convey mode and the brake mode; and the motor and controller configured such that in the brake mode, power to the motor is interrupted and windings in the motor are short-circuited, wherein rotation of the drive roller from the attempted reeling of the lottery tickets converts the motor to a generator, the short-circuited windings creating a load on the generator that produces the retarding force on the drive roller.

* * * * *